Jan. 25, 1949.

I. S. BOWEN 2,460,163

PROJECTILE FLIGHT RECORDING
MULTIPLE EXPOSURE CAMERA

Filed April 15, 1947

INVENTOR
IRA S. BOWEN

BY

ATTORNEY

Jan. 25, 1949.　　　　I. S. BOWEN　　　　2,460,163
PROJECTILE FLIGHT RECORDING
MULTIPLE EXPOSURE CAMERA

Filed April 15, 1947　　　　　　　　　　3 Sheets-Sheet 2

INVENTOR
IRA S. BOWEN
BY
ATTORNEY

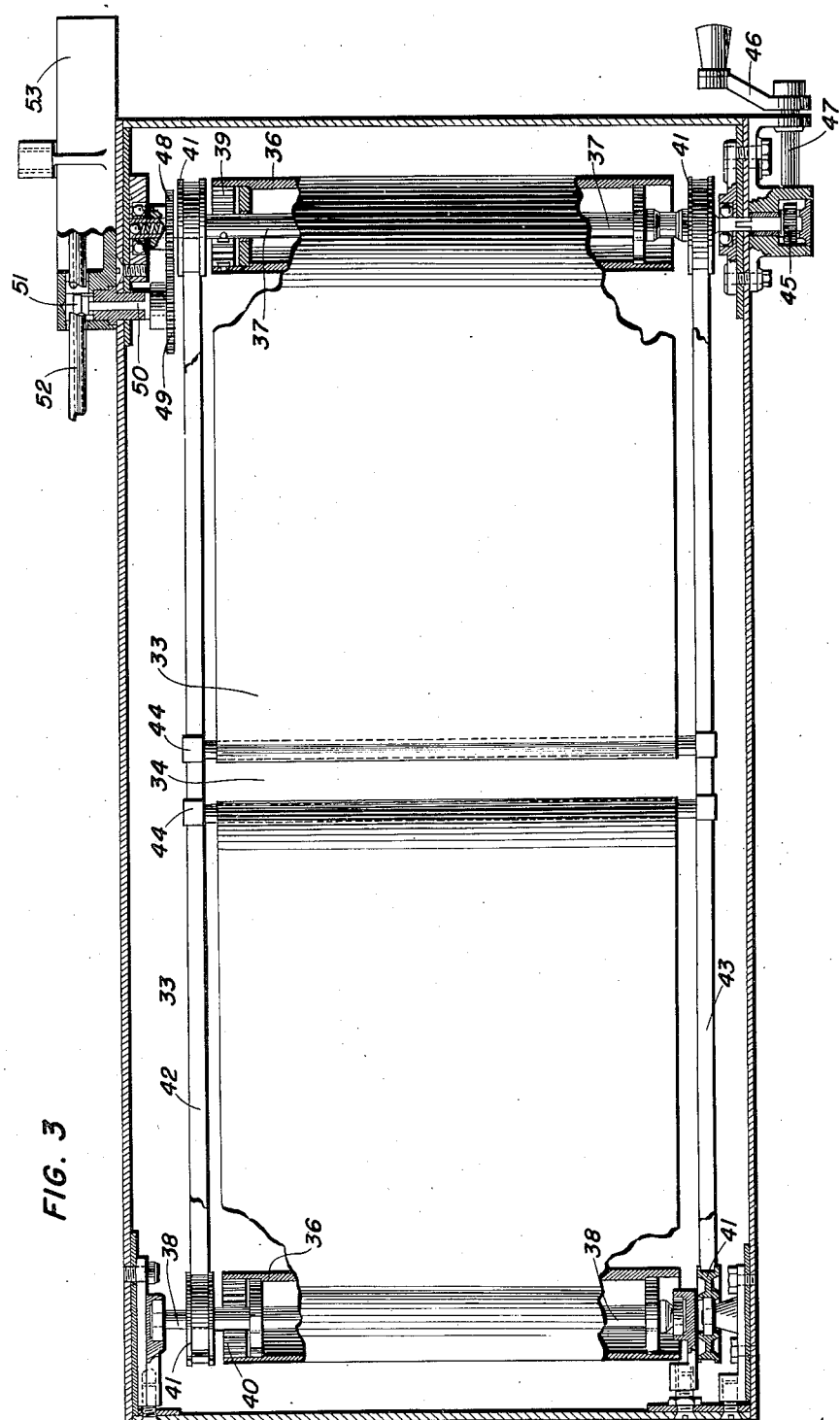

Patented Jan. 25, 1949

2,460,163

UNITED STATES PATENT OFFICE 2,460,163

PROJECTILE FLIGHT RECORDING MULTIPLE EXPOSURE CAMERA

Ira S. Bowen, Pasadena, Calif., assignor to the United States of America as represented by the Secretary of the Navy Application April 15, 1947, Serial No. 741,453

1 Claim. (Cl. 95—36)

This invention relates to a camera and shutter for the same, and more particularly to a camera suitable for photographing the trajectory of a projectile, such as a rocket, in flight.

An object of the invention is to provide apparatus for automatically making accurately timed photographic exposures at accurately timed intervals.

Another object of the invention is to provide apparatus for photographing the flight of a body through space.

A further object of the invention is to provide apparatus for automatically making a series of rapid photographs of a moving object on a single photographic plate.

An additional object of the invention is to provide photographic means for determining the actual trajectory of a projectile in flight.

Another object of the invention is to provide a camera shutter for making precisely timed multiple exposures upon a single photographic plate at automatically and accurately timed intervals, in which the timing of the exposures and the intervals may be varied.

A further object of the invention is to provide means for successively exposing small and different portions of a photographic plate to the image of a moving object.

Another object of the invention is to provide a camera with a movable telescopic sight, having connections aligning a slot in a plate masking screen with the camera image of the moving object being photographed.

Other objects of the invention will be apparent by reference to the drawings and specifications.

In the accompanying drawings:

Fig. 3 is a sectional view taken on line 3—3 of Fig. 1, and having certain parts cut away.

Figure 1:
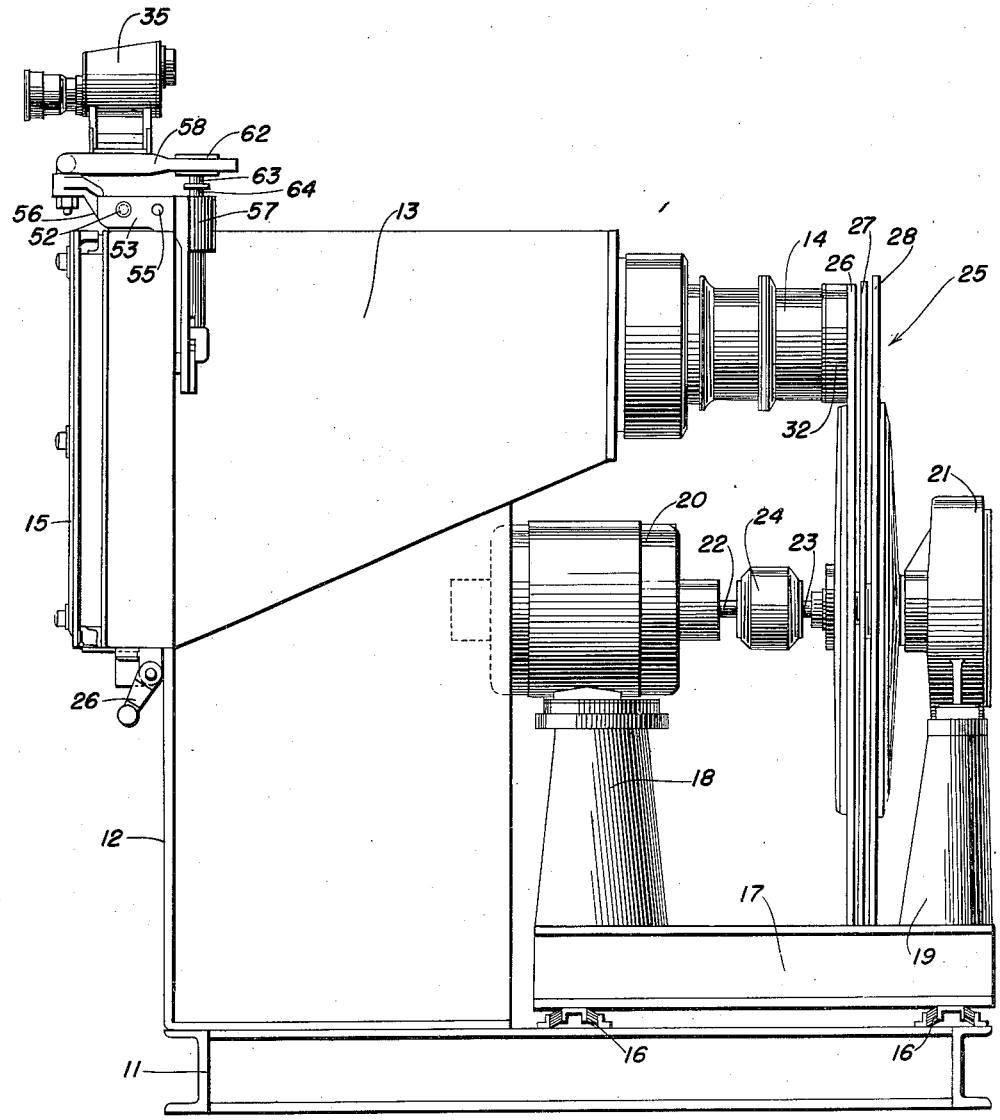
Fig. 1 is a side elevational view of the invention.

Mounted on a base frame 11 is a camera pedestal 12 rigidly supporting the camera 13. At the forward end of the camera housing is a lens barrel 14, and at the rear is plate holder 15 which contains a photographic plate (not shown). Also mounted on the base frame 11, preferably on resilient mountings 16, is a secondary frame 17 having a motor pedestal 18 and a gear pedestal 19 supporting an electric motor 20 and a reduction gear 21 respectively. Motor shaft 22 is coupled to center shaft 23 by coupling 24.

Figure 2:
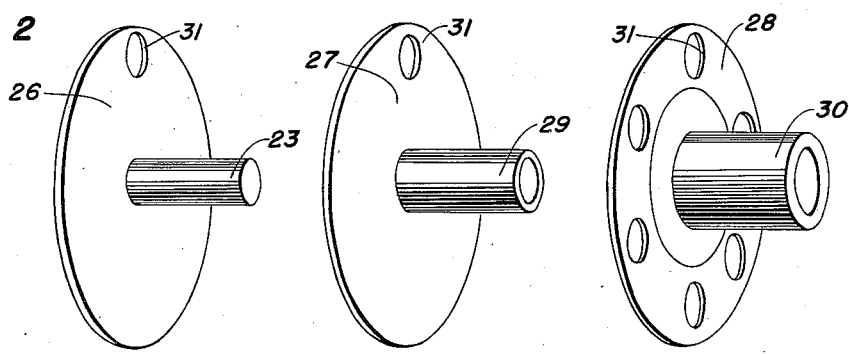
Fig. 2 is an exploded perspective view of the shutter.
Figure 4:
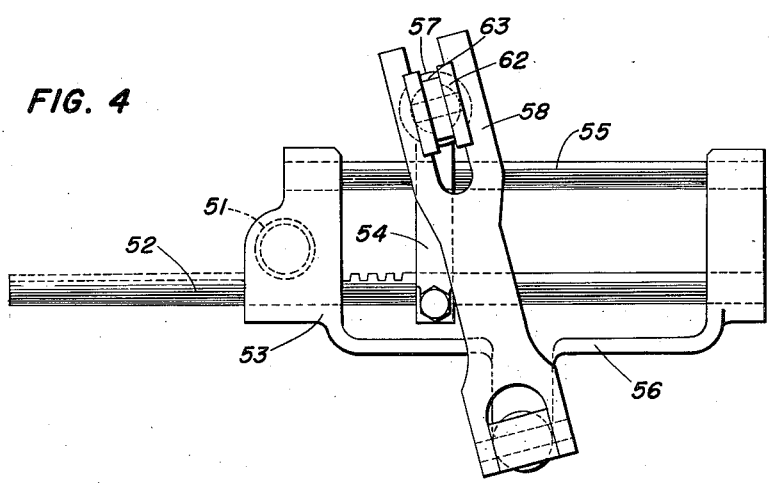
Fig. 4 is a plan view of the mechanism shown at the upper right-hand corner of Fig. 3.
Figure 5:
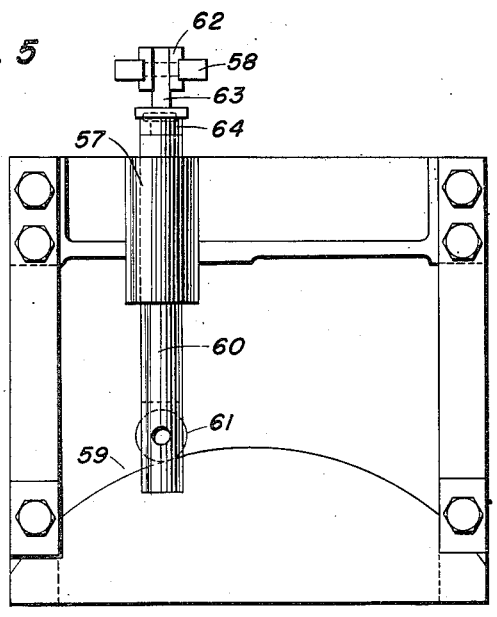
Fig. 5 is an elevation view of the mechanism for tilting the telescopic sight.

The shutter 25 consists of three rotating opaque discs 26, 27 and 28, mounted on the concentric shafts 23, 29 and 30, respectively, as shown in Fig. 2. Shutter discs 26 and 27 are each provided with an opening 31 whereas disc 28 has six of these openings 31. From one to five of the openings 31 in disc 28 may be covered as desired. Shaft 23 not only drives disc 26, but also extends into the reduction gear box 21 and supplies the power to drive the tubular shafts 29 and 30 at reduced speeds through conventional reduction gears.

In the preferred embodiment, the motor 20 drives shaft 23 and disc 26 at 30 revolutions per second; and the gearing is such that disc 27 is rotating at 6 revolutions per second and disc 28 at 1 revolution per second. Other speeds may be used as the occasion demands. Motor 20 may be a synchronous motor or any other type of A. C. or D. C. motor preferably one which operates at constant speed. The use of a speed controller or rheostat, where possible, is an optional feature. Either or both of discs 27 and 28 may be rotating in the same or opposite direction with respect to disc 26 as desired; this is determined by the design of the reduction gearing. Shutter discs 26 and 27 each contain a single opening 31. On the other hand, shutter disc 28 has six of these openings, of which any number from one to five may be closed off as desired. With this type of shutter a photographic exposure is made only when openings 31 in all three discs pass the lens at the same time. Thus with the motor running at constant speed, a series of accurately timed rapid photographic exposures is made at accurately timed intervals. The timing of the intervals between exposures may be varied by changing the speed of the motor, the number of openings 31 or, with more difficulty, by substituting reduction gears of different ratios. The timing of each exposure may be varied by changing the speed of the motor or by changing reduction gears, but this is accomplished most easily by altering the size of the shutter openings. Although circular openings 31 are shown in Fig. 2, arcuate slots can be employed instead and the length of the slots can be easily regulated by covering a portion of the slots with adhesive masking tape.

The shutter is arranged close to but not touching lens barrel 14. A light-excluding collar or lens shade 32 is optional to prevent the entrance of any light rays into the lens from the space between the end of lens barrel 14 and shutter disc 26. The collar, preferably of black felt or other soft material, should fit over the exterior of the lens barrel and bear lightly against the shutter disc 26.

When a photographic exposure is made, only a small portion of the large plate is exposed; as the entire plate is covered by the masking screen 33, except for the vertical strip unmasked by the slot 34. The station at which the camera is mounted is so selected that the entire trajectory, or a selected portion thereof, of a projectile may be photographed on a single large plate mounted in the plate holder 15. The monocular sight 35, which contains a vertical sight line, is moved to keep the sight line trained on the projectile in flight. The horizontal component of this movement is transmitted to the masking screen 33 through the same mechanism which drives sight 35. This positions the slot 34 so that only the vertical strip of the photographic plate on which the image of the projectile falls will be exposed at any given instant.

Screen 33 is somewhat similar to a focal plane shutter but is mounted somewhat differently, and its use and operation are entirely different. The rollers 36 are journaled and spring mounted on shafts 37 and 38 instead of being rigidly fixed to the shafts 37 and 38. One end of each of the spiral springs 39 and 40 is attached to a roller and the other end is attached to a shaft. Viewing these springs from above, spring 39 is coiled in a clockwise direction, and spring 40 is coiled in the reverse or counterclockwise direction. The springs are placed under slight tension in assembling the camera, and thereafter maintain the screen 33 taut at all times. Since the effective diameter of the rollers 36 changes as the screen wraps or unwraps thereon, pulleys 41 are fixed to the shafts 37 and 38 and connected by a drive tape 42 so that the movement of the slot 34 will correspond exactly to the movements of the shaft 37 rather than the rollers. Thus the rollers 36 are actually driven by the screen 33, which is attached to the drive tape 42 and guide tape 43 by the bands 44.

In order to correctly position the slotted aperture 34 and the vertical sight line of the monocular sight 35, shaft 37 is driven through worm gear set 45 by crank 46 on shaft 47. When crank 46 is revolved, the shaft 37 is rotated along with its pulley 41 which positions the slot 34 by moving the drive tape 42. Spur gear 48 on shaft 37 is enmeshed with another spur gear 49 to drive stub shaft 50 and pinion 51. Since this pinion engages the rack 52 of circular cross-section, it will be readily seen that the rack is moved by turning crank 46. The rack is slidably supported in the bracket 53 and carries a rigidly attached link 54 disposed at right angles to the rack. The bracket is bolted to the camera housing and provided with a guide rod 55 on its forward side and a projecting ear 56 at the rear. The guide rod passes through a hole in the link 54 and thus supports the forward end of the link. On the forward end of the link is a vertically aligned guide 57. The sight 35 is secured to a support 58 having a fork at each end. The rear fork or clevis of support 58 is attached to ear 56 by horizontal and vertical pivot means. In order to maintain the projectile in the field of view of the sight and eliminate the need of manual vertical adjustment, cam 59 actuates a push rod 60 equipped with a roller 61 as the cam follower. The cam is shaped to correspond approximately to the expected trajectory of the projectile, or the portion thereof which it is desired to photograph. The push rod 60 operates in the vertical guide sleeve 57 and is connected to the forward yoke of support 58 by means of the shoes 62 which slidably engage the yoke and are attached to eye 63 of the push rod by means of a horizontal pivot or wrist pin (not shown). The eye 63 is rotatable about a vertical pivot in the collar 64 on the push rod.

In operating the camera, the telescopic sight 35 is aimed in the direction in which the projectile is first expected to appear; a fresh photographic plate is installed in the plate holder 15, and motor 20 is energized to actuate the automatic shutter. With the camera fixed in position, the operator, upon first seeing the projectile in sight 35, revolves the crank to maintain the vertical sight line on or as close to the projectile as possible and tracks the projectile across the sky. The hand crank 46 rotates shaft 47, gearing 45, shaft 37 and pulley 41 to move the drive tape 42 and screen 33 to laterally position slot 34 in alignment with the image projected inside the camera. Meanwhile the motor 20 drives disc 26 directly and discs 27 and 28 through the reduction gearing 21 to automatically make accurately timed exposures of the projectile on the photographic plate at accurately timed intervals whenever three openings 31 in the shutter discs are in line with the lens barrel 14. At the same time, the further gears 48, 49 and 51 are shifting the rack 52, and the rigid link 54 turns the forward end of forked support 58 and also the sight about the fixed vertical pivot attached to the rear end of the forked support in order to horizontally direct the sight upon the projectile. As the link 54 with its guide sleeve 57 and push rod 60 are shifted, the cam roller 61 moves across cam 59 thereby raising or lowering the push rod to swing the forward end of the forked support and the sight up or down around the horizontal pivot attached to the rear clevis of the support in order to vertically direct the sight upon the projectile.

After the projectile has been fired and photographed, the photographic plate is removed and developed in the customary manner. It will be found to show a series of images of the projectile at various points in its path of travel. By the use of this device, valuable data may be graphically obtained for ballistic studies. However, it is obvious that the camera of the present invention is capable of many other uses, especially in connection with photographing moving objects.

My invention is to be regarded as limited in no way by the preferred embodiment disclosed herein but only by the true and proper scope of the appended claim.

I claim:

In a camera a light focusing unit and a light sensitive surface, a masking screen provided with an aperture and located between the light focusing unit and the light sensitive surface, manually operable means for aligning the aperture with the camera image of an object, a sight operable in train by said means, a cam having a surface vertically disposed relative to a reference plane corresponding substantially to at least a portion of the trajectory of said object in said vertical plane, follower means for said cam operatively connected to said sight for changing its vertical angle with respect to said reference plane as said sight is moved in train to maintain said object in the field of view of said sight and an automatic shutter for said light focusing unit.

IRA S. BOWEN.

REFERENCES CITED

The following references are of record in the file of this patent:

UNITED STATES PATENTS

| Number | Name | Date |
| --- | --- | --- |
| 1,782,860 | Reipert | Nov. 25, 1930 |
| 2,186,203 | Centeno | Jan. 9, 1940 |
| 2,268,133 | Carlson | Dec. 30, 1941 |
| 2,420,339 | Rabinow | May 13, 1947 |